Aug. 15, 1967  R. J. SLOAN ETAL  3,336,530
DIRECTION FINDING SYSTEM FOR HUNTING DOGS
Filed Oct. 14, 1964  2 Sheets-Sheet 1
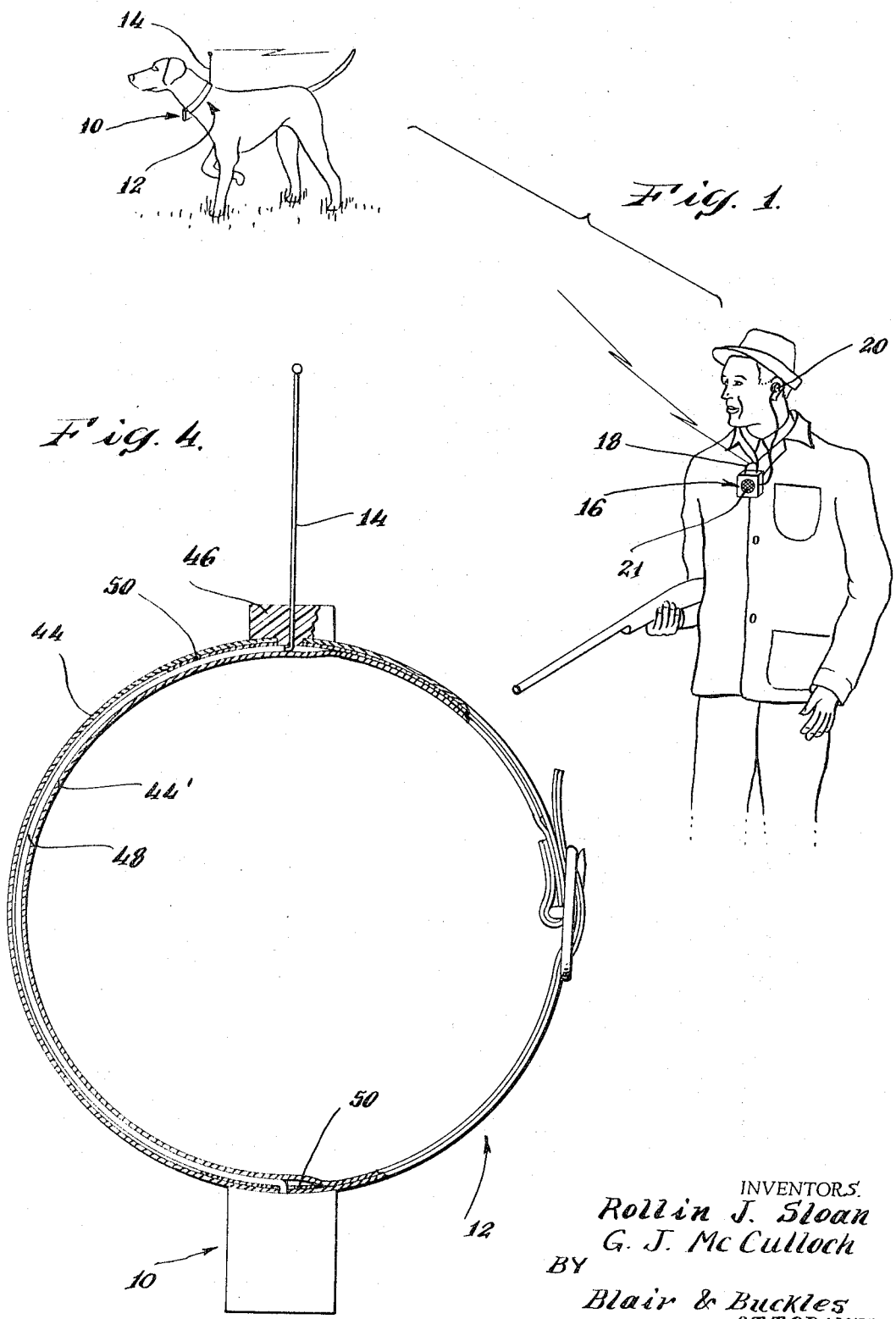
INVENTORS.
Rollin J. Sloan
G. J. McCulloch
BY
Blair & Buckles
ATTORNEYS

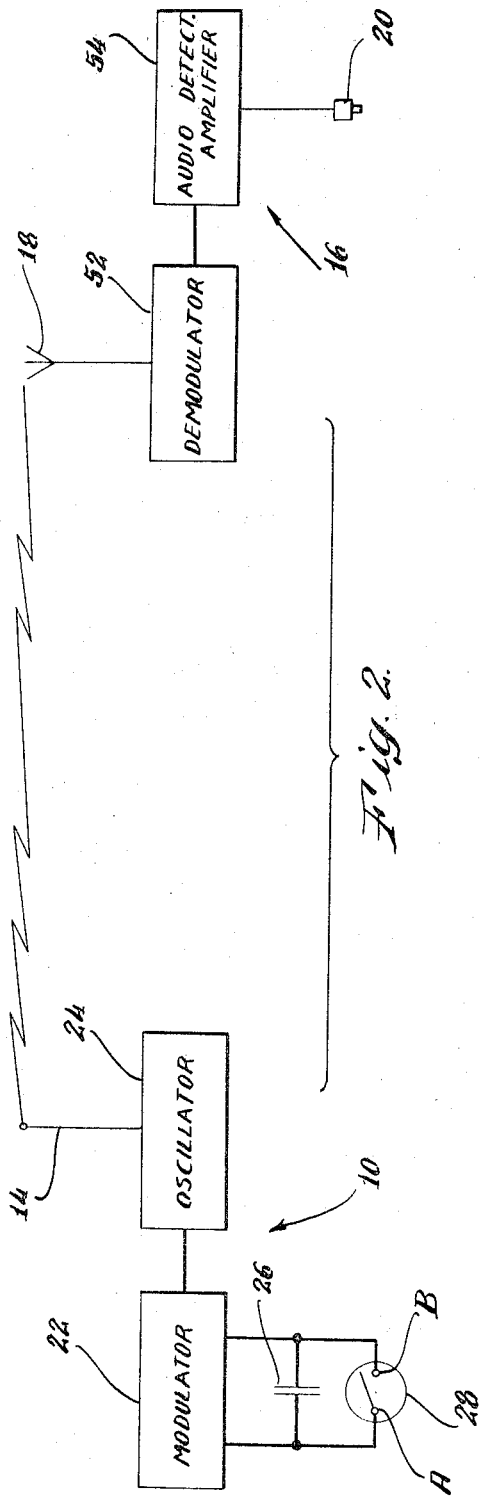
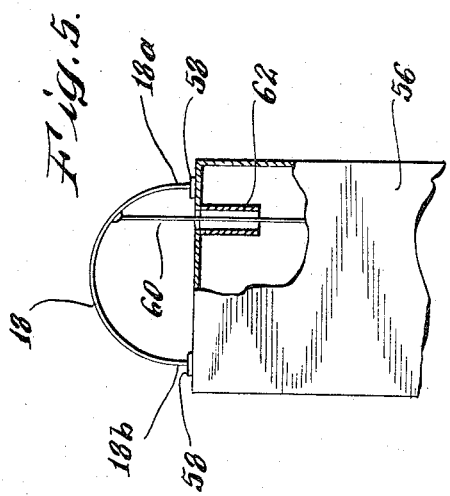
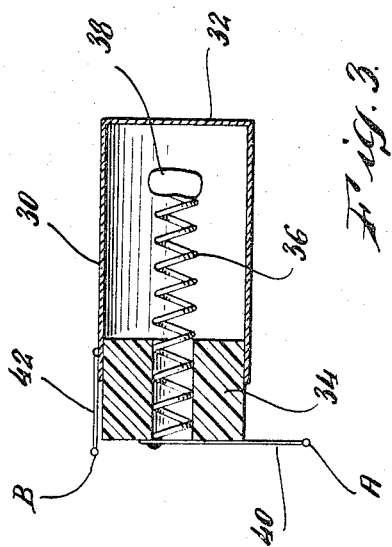
INVENTOR.
Rollin J. Sloan
G. J. McCulloch
BY
Blair & Buckles
ATTORNEY.

United States Patent Office 3,336,530
Patented Aug. 15, 1967

3,336,530
DIRECTION FINDING SYSTEM FOR
HUNTING DOGS
Rollin J. Sloan and Garland J. McCulloch, Tampa, Fla.,
assignors to Trak Microwave Corporation, Tampa, Fla.
Filed Oct. 14, 1964, Ser. No. 403,736
4 Claims. (Cl. 325—29)

The present invention relates to a direction finding system. More particularly, it relates to a miniaturized electronic apparatus for determining the relative direction to a remote source of radio transmissions. One aspect of the invention is directed to modulating such radio transmissions so as to provide information as to the activity at the location of a remote radio transmitting source. Another aspect is directed to the incorporation of such a radio transmitting source in a piece of wearing apparel.

Our invention has particular application to the sport of hunting where a dog is utilized to seek out game for the hunter. In the description to follow, our invention will be particularly disclosed in connection with this application. However, it will be readily apparent that numerous other applications for our invention exist.

When hunting pheasants or partridge, for example, it is desirable, if not essential, to employ a bird dog. Without a dog, the hunter is severely limited as to the area that can be thoroughly hunted. Moreover, a hunter oftentimes has no advance warning when coming upon concealed game birds and is thus not fully prepared to shoot when the birds are flushed. Once flushed, the hunter may be afforded only a matter of a few seconds in which to get off a successful shot at the fleeing birds. Oftentimes, before the hunter has recovered from the initial surprise caused by the birds taking wing, the opportunity to fire has passed. This is quite discouraging, particularly now that game birds are becoming less plentiful, more wary and considerably harder to find.

The advantages of a reasonably well trained bird dog are well appreciated by the experienced hunter. A bird dog can hunt over a greater area and readily penetrate thickets and brush likely to conceal game birds. Moreover, a bird dog has the distinct advantage of smell to assist in the search for game birds. A bird dog instinctively will "point" or freeze when it has pin-pointed the location of game birds. This instinct can be developed so that the dog will not flush the birds. Thus, when a hunter sees his dog "on point," he is forewarned that game birds are concealed nearby.

Since a bird dog has considerable range in comparison to that of the hunter, it may be hunting at some distance from the hunter. Often as not, the dog is out of the hunter's sight, either over a hill, in or beyond brush and woods, etc. Typically, a dog is trained to hunt close to the hunter but, in its zeal and because of its greater mobility, it oftentimes ranges considerable distances from the hunter in its search for game birds. The hunter, having lost track and sight of the dog, may not know where the dog is or in what direction it has gone. To continually call out for the dog to keep it within reasonable range of the hunter not only distracts the dog from its hunting but arouses the already skittish game birds.

As often occurs, the dog, while hunting in remote areas and out of sight of the hunter, comes upon game birds hiding in the brush. Having pin-pointed the birds, the dog will go "on point" waiting for the hunter to come on the scene. Quite likely, the hunter does not know where his dog is and particularly that he is "on point." While "on point," the dog is particularly insensitive to the hunter's call, and thus the hunter must go unassisted in search of his dog. Eventually, the dog will tire, breaking the "point" and flushing the birds without being commanded. Nothing is more frustrating to a hunter than to find that his dog has located and flushed out game birds before he arrived on the scene.

It is accordingly an object of the present invention to provide a direction finding system.

An additional object is to provide a system of the above character which is applicable to locating a remote point by providing information as to the relative direction to such a remote point.

A further object is to provide a system of the above character for developing information relative to the activity at such a remote point.

A still further object is to provide a simplified, miniaturized system of the above character including a radio transmitter and a radio receiver.

An additional object is to provide a system of the above character having particular application to the sport of hunting where the transmitter is carried by the hunting dog and the receiver is carried by the hunter. The system operates to constantly advise the hunter of the direction to his dog and whether his dog is hunting game or "on point."

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a pictorial view depicting the application of our invention to the sport of hunting;

FIGURE 2 is an electronic block diagram of a tracking system constructed according to our invention;

FIGURE 3 is a cross-sectional view of a portion of the radio transmitter of FIGURE 2;

FIGURE 4 is a cross-sectional view of a dog collar for mounting the radio transmitter of FIGURE 2; and FIGURE 5 is a partial front elevational view of the radio receiver of FIGURE 2.

Similar reference characters refer to similar parts throughout the several views of the drawings.

Referring to the drawings and particularly to FIGURE 1, a miniaturized transmitter, generally indicated at 10, is suitably affixed to and carried by a collar, generally indicated at 12 and best seen in FIGURE 4, worn by a hunting dog. An omnidirectional antenna 14, such as a whip antenna, is also suitably mounted on the dog collar 12 so as to extend vertically upward. The antenna 14, connected to the output of the transmitter 10, radiates electromagnetic waves substantially uniformly in all directions.

A miniaturized receiver, generally indicated at 16 and carried by a hunter, is provided with a highly directional antenna 18, such as a loop antenna seen in FIGURE 5. An earplug 20, worn by the hunter, or if preferred, a speaker 21 develops audible tones in response to the reception of radio transmissions from the transmitter 10. By selectively orienting the antenna 18 while listening to the audible tones, the hunter is readily able to determine the general direction from which the radio transmissions are being received.

According to an important feature of our invention, the radio transmissions are modulated, in a manner to be described in connection with FIGURE 2, according to the dog's present activity, to wit, whether the dog is running, working game, or "on point." Receipt of the modulated radio transmissions by the receiver 16 develops correspondingly modulated audible tones to advise the hunter of his dog's activities as well as the general direction to his dog. The hunter is thus able to keep track of his dog and move in quickly when it is "on point."

Turning now to FIGURE 2, the transistorized transmitter, indicated at 10, includes a modulator 22 and an oscillator 24. Preferably, the modulator 22 functions to pulse modulate the oscillator 24 so that greater peak power outputs can be achieved using a conventional 9-volt transistor radio battery. The modulator 22 preferably consists of an astable multivibrator formed by a pair of cross-coupled transistors. The output pulses from the modulating multivibrator key the oscillator 24 to produce corresponding pulses of electrical energy at a carrier frequency preferably in the range above 400 megacycles. In this frequency range no special permit or license is required.

A capacitor 26 is connected into one of the cross-coupling paths of the multivibrator embodying the modulator 22. A "jiggle" switch 28, connected across the capacitor 26, is operable to short out the capacitor 26 thereby varying the parameters of the multivibrator circuit. As a result, the multivibrator operates at one pulse rate when the capacitor 26 is shorted out by the "jiggle" switch 28 and at a different pulse rate when the "jiggle" switch is open. An astable multivibrator can be readily designed so as to pulse modulate the oscillator 24 at a representative rate of 2,000 cycles per second when the capacitor 26 is included in the cross-coupling path. Then for example, with the capacitor 26 shorted out by the "jiggle" switch 28, the pulse modulating rate reduces to 1,500 cycles per second.

Turning to FIGURE 3, the "jiggle" switch 28 will be described in detail. It comprises an outer tubular member 30 formed of an electrically conducting material such as brass and closed at one end by a cover 32. A plug 34, formed of suitable insulating material, is secured in the other end of the tubular member 30. A helical spring 36, formed of electrically conductive wire, is cantilever mounted in a central bore in the end plug 34 to be disposed coaxially within the tubular member 30. The free end of the spring 36 is weighted down with solder, indicated at 38. The other end of the spring 36, projecting through the plug 34, is electrically connected by solder to a conductor 40 which corresponds to the terminal A of the "jiggle" switch schematically shown in FIGURE 2. The tubular member 30 is connected by solder to a conductor 42 corresponding to switch terminal B.

In operation, the acceleration responsive spring 36 will oscillate when the dog is in motion causing the soldered end of the spring to repeatedly contact the tubular member 30 and short out the capacitor 26. Thus, the pulse modulation of the oscillator 24 will fluctuate between the higher rate and the lower rate depending upon the condition of the "jiggle" switch 28. When the dog is motionless however, the capacitor 26 will remain unshorted and the modulator 22 will be continuously pulse modulating the oscillator 24 at the higher rate. When this occurs, the dog is very likely "on point."

Turning to FIGURE 4, the dog collar 12, serving to mount the transmitting antenna 14 and the transmitter 10, is preferably formed from at least two plies 44, 44' of tough, water resistant plastic or leather. The whip antenna 14 is mounted in an insulating block 46 suitably affixed to the collar 12 such as by rivets. The transmitter 10 is suitably attached to the collar 12 at a point diametrically opposed to the antenna 14. Thus, when the collar 12 is worn by the dog, the weight of the transmitter 10, only three to four ounces, will serve to maintain the collar oriented so that the antenna 14 extends substantially vertically upward. The antenna 14, about 6 inches in length, will not interfere with the dog's activity and, at the same time, is maintained upright at sufficient height above the ground to insure reasonable range.

A small coaxial cable 48 incorporated between plies 44, 44' of the collar 12 connects the antenna 14 to the transmitter 10. A suitable metal foil 50, such as copper or aluminum, is also incorporated between the plies of the collar 12 and insulated from the coaxial cable 48. This conductive foil serves as a ground plane for the antenna 14.

Returning to FIGURE 2, the receiver 16 includes a pulse demodulator 52 tuned to the carrier frequency of the transmitter 10. The output of the demodulator 52 is audio detected and amplified by an audio detector-amplifier 54. The earplug 20 or, alternatively, the speaker 21 connected to the output of the audio detector-amplifier 54 provides the audible signals to the hunter. The demodulator 52 may be a superregenerative RF detector comprising a transistor oscillator tuned to oscillate at the particular carrier frequency of the transmitter 10. The oscillation of this oscillator is pulse modulated according to the modulation of the received radio transmissions from the transmitter 10. The output from the demodulator 52 is then audio detected by the audio-detector-amplifier 54. At the higher pulse modulating rate of 2,000 cycles per second, the audible tone heard through the earplug 20 sounds as a continuous audio note. However, when the pulse modulating rate is fluctuating between the higher and the lower pulse rates due to the operation of the jiggle switch 28 previously described, the audio tone is variable thus indicating to the hunter that his dog is in motion. Since the rate of this fluctuation corresponds to the degree of motion of the dog and, in turn, produces corresponding degrees of varying audio tones, the hunter, with practice, can readily determine whether his dog is running, stalking or "on point." This feature provides a valuable aid in training young dogs.

Turning to FIGURE 5, the receiving antenna 18 is in the form of a half loop. One end 18a of the antenna loop is mounted in electrical contact with a metallic housing 56 for the receiver 16. The other end 18b, capacitively coupled to the housing 56 is fitted in a grommet 58 affixed to housing. A conductor 60 is connected at a point along the antenna loop where the antenna is substantially series resonant at the carrier frequency. The conductor 60 extends through an insulating sleeve 62 to connect with the receiver input.

The geometry of the receiving antenna 18 is such that when the antenna loop is oriented into a plane perpendicular to the direction from which the radio transmissions are being received from the transmitter 10 no pick up is achieved and the audio tone disappears or nulls. When the receiving antenna 18 is oriented out of this plane, electromagnetic energy is coupled to the receiver input and an audio tone is then heard. Accordingly, the receiving antenna 18 can be readily oriented by the hunter until an audio null is obtained, thus indicating the direction to the location of his dog.

It will thus be seen that our invention provides a simple and compact direction finding system. Although our invention has been described in connection with its application to the sport of hunting, it will be appreciated that other applications exist. For example, our invention could be used to keep track of and locate a child in a crowd of people, woods, etc. By virtue of the "jiggle"

switch, the receiver indicates the nature of the activity of the person or animal carrying the transmitter. The transmitter can be made compact, rugged and light weight so as not to encumber or otherwise bother the wearer. The receiver may be hand carried or attached to a strap looped around the neck of the user, or may be installed in a child's "beanie" cap and, like the transmitter, is light weight, compact, rugged and unobtrusive. Using conventional transistor radio batteries, an effective range of up to one-quarter of a mile can be readily obtained. Moreover, a number of transmitters and receivers may be used in the same locality without interference merely by selectively tuning to different carrier frequencies.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A direction finding system comprising, in combination:
    A. a portable radio transmitter carried by a moving body, said transmitter having
        (1) an oscillator developing high frequency electrical energy,
        (2) an omnidirectional antenna coupled to said oscillator to radiate said electrical energy into space in the form of radio signals,
        (3) a modulator including an astable multivibrator and a capacitor connected to said oscillator to pulse modulate said radio signals, and
        (4) acceleration responsive means comprising a switch operating to short out said capacitor in response to movement of said body so as to vary the pulse modulating rate of said modulator according to the motional activity of said body; and
    B. a remotely located receiver tuned to the frequency of said radio signals transmitted by said transmitter, said receiver having
        (1) a directional antenna responding to said radio signals,
        (2) a demodulator connected to said directional antenna to demodulate said radio signals, and
        (3) output means connected to said demodulator to provide an indication of the direction from said receiver to said transmitter and the activity of said moving body carrying said transmitter.

2. A direction finding system comprising, in combination:
    A. a portable radio transmitter carried by a moving body, said transmitter having
        (1) an oscillator developing high frequency electrical energy,
        (2) an omnidirectional antenna coupled to said oscillator to radiate said electrical energy into space in the form of radio signals,
        (3) a modulator including an astable multivibrator and a capacitor connected to said oscillator to pulse modulate said radio signals, and
        (4) acceleration responsive means comprising a switch operating to short out said capacitor in response to movement of said body so as to vary the pulse modulating rate of said modulator according to the motional activity of said body; and
    B. a remotely located received tuned to the frequency of said radio signals transmitted by said transmitter, said receiver having
        (1) a directional antenna responding to said radio signals,
        (2) a demodulator connected to said directional antenna to demodulate said radio signals, and
        (3) output means including an audio detector-amplifier and a speaker connected to said demodulator to provide audible output indications of the direction from said receiver to said transmitter and of the activity of said moving body carrying said transmitter.

3. A system for enabling a hunter to determine the remote location of his hunting dog and the nature of the dog's activity at the remote location, said system comprising, in combination:
    A. a portable radio transmitter having
        (1) an oscillator developing high frequency electrical energy,
        (2) an omnidirectional antenna coupled to said oscillator to radiate said electrical energy into space in the form of radio signals,
        (3) a modulator including a capacitor in one of the cross-coupling paths of an astable multivibrator connected to said oscillator to modulate said radio signals, and
        (4) acceleration responsive means comprising a switch repeatedly opening and closing to short out said capacitor in response to the activity of said dog so as to correspondingly vary the pulse modulating rate of said modulator, said switch remaining open when said dog becomes motionless
    B. a collar worn on the neck of said dog, said collar serving to
        (1) mount said transmitter so as to maintain said antenna in a substantially upright position,
        (2) said acceleration responsive means causing said radio signals to be modulated in accordance with the motional activity of said dog; and
    C. a receiver carried by said hunter and tuned to the frequency of said radio signals transmitted by said transmitter, said receiver having
        (1) a directional antenna responding to said radio signals,
        (2) a demodulator connected to said directional antenna to demodulate said radio signals, and
        (3) output means connected to said demodulator to provide indications of the direction from said hunter to said dog and the activity of said dog.

4. A system for enabling a hunter to determine the remote location of his hunting dog and the nature of the dog's activity at the remote location, said system comprising, in combination:
    A. a portable radio transmitter having
        (1) an oscillator developing high frequency electrical energy,
        (2) an omnidirectional antenna coupled to said oscillator to radiate said electrical energy into space in the form of radio signals,
        (3) a modulator including a capacitor in one of the cross-coupling paths of an astable multivibrator connected to said oscillator to modulate said radio signals, and
        (4) acceleration responsive means comprising a switch repeatedly opening and closing to short out said capacitor in response to the activity of said dog so as to correspondingly vary the pulse modulating rate of said modulator, said switch remaining open when said dog becomes motionless
    B. a collar worn on the neck of said dog, said collar serving to
        (1) mount said transmitter so as to maintain said antenna in a substantially upright position,
        (2) said acceleration responsive means causing said radio signals to be modulated in accordance with the motional activity of said dog; and C. a receiver carried by said hunter and tuned to the frequency of said radio signals transmitted by said transmitter, said receiver having (1) a directional antenna responding to said radio signals, (2) a demodulator connected to said directional antenna to demodulate said radio signals, and (3) output means including an audio detector-amplifier and a speaker connected to said demodulator to provide audible indications to said hunter of the direction from said hunter to said dog and of the activity of said dog.

References Cited

UNITED STATES PATENTS

| | | | |
|---|---|---|---|
| 1,801,466 | 4/1931 | Townsend | 332—2 |
| 2,800,104 | 7/1957 | Cameron et al. | |
| 3,053,949 | 9/1962 | Johnson. | |
| 3,115,635 | 12/1963 | Leeming et al. | 325—361 X |
| 3,163,856 | 12/1964 | Kirby | 340—261 X |

OTHER REFERENCES

F.C.C. Public Notice, G, 85933, Mar. 18, 1960.
Morrison et al.: Radio News, April 1939, p. 42.

JOHN W. CALDWELL, *Acting Primary Examiner.*